April 27, 1943.　　A. W. HOLMES ET AL　　2,317,530
HELIX FORMER
Filed April 6, 1940　　2 Sheets-Sheet 1

INVENTORS
ALVIN W. HOLMES,
GEORGE W. BENJAMIN and
LUTHER P. YOUNG,
BY
ATTORNEYS.

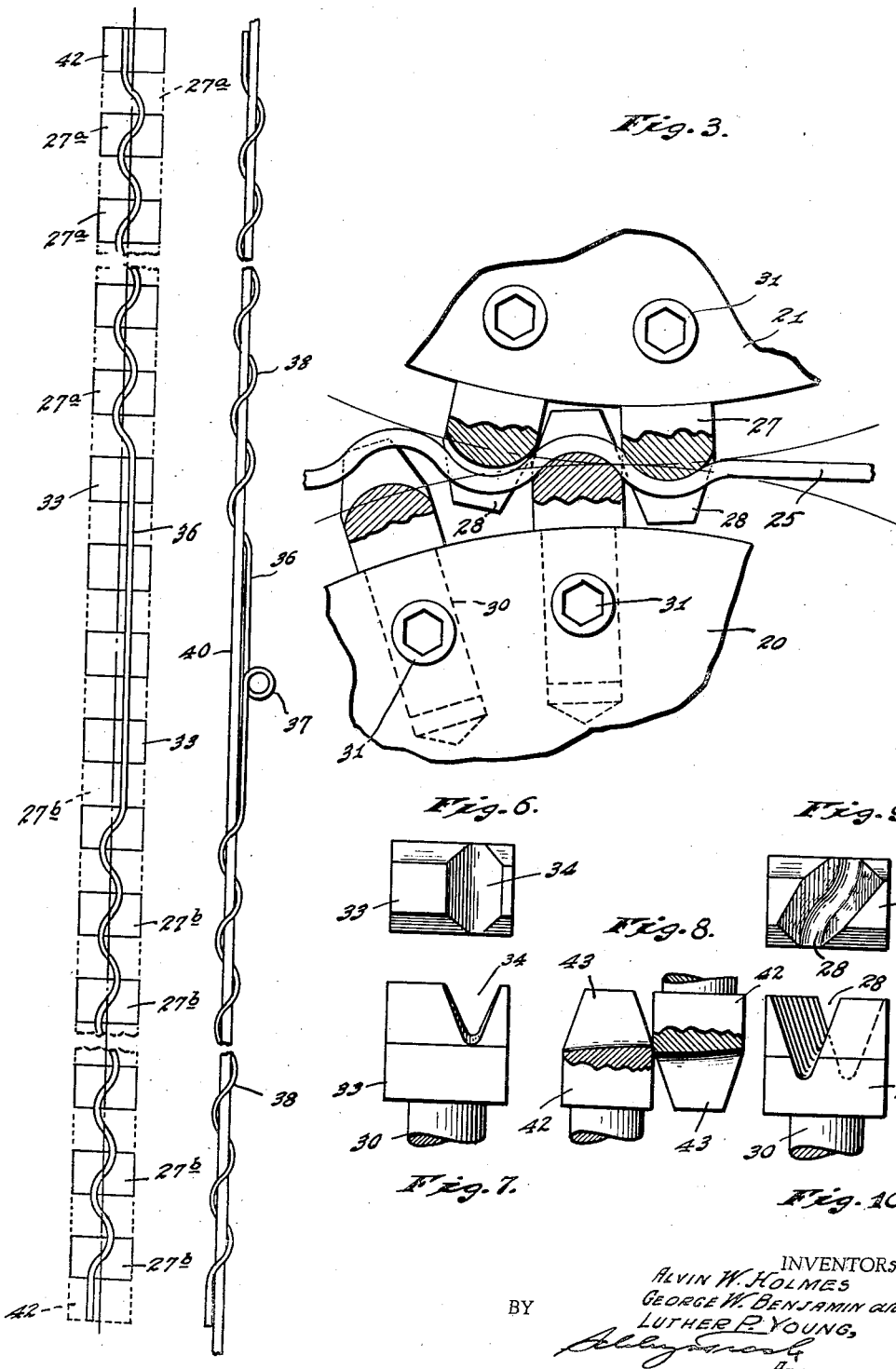

Patented Apr. 27, 1943

2,317,530

UNITED STATES PATENT OFFICE 2,317,530

HELIX FORMER

Alvin W. Holmes, George W. Benjamin, and Luther P. Young, Muncie, Ind., assignors to Kitselman Brothers, Muncie, Ind., a corporation of Indiana Application April 6, 1940, Serial No. 328,174

9 Claims. (Cl. 140—105)

Our invention relates to the production of helical coils of wire, and especially to coils in which the coil-diameter is small and the pitch long relative to the size of the wire from which the coil is formed. It is the object of our invention to form such coils simply and economically, to provide means which will form a helical coil in portions only of a length of wire, and, in general, to produce helical coils of a size and pitch which could be formed only with difficulty by the conventional expedient of winding the wire around a rotating mandrel.

In the most common form of our invention, we employ a pair of co-planar wheels rotatable about parallel axes and provided with meshing teeth. Each of these teeth is provided with a groove the bottom of which is shaped to conform to the inner surface of a half-turn of the helix which is to be formed, and the side walls of which flare outwardly. As the two wheels are rotated in opposite directions, a wire fed between them into the grooves of the teeth will be progressively deflected laterally of itself into the desired helical form. If desired, only a portion of the teeth on each wheel may be provided with helical grooves and the remainder of the teeth provided with co-planar circumferentially extending grooves which, when co-operating with the wire, will produce no lateral deflection thereof. If the articles to be formed with helical coils have a definite length, the teeth on the wheels may include a pair of co-operating cut-off teeth which will shear the wire periodically as the wheels are rotated.

Figures 1, 2:
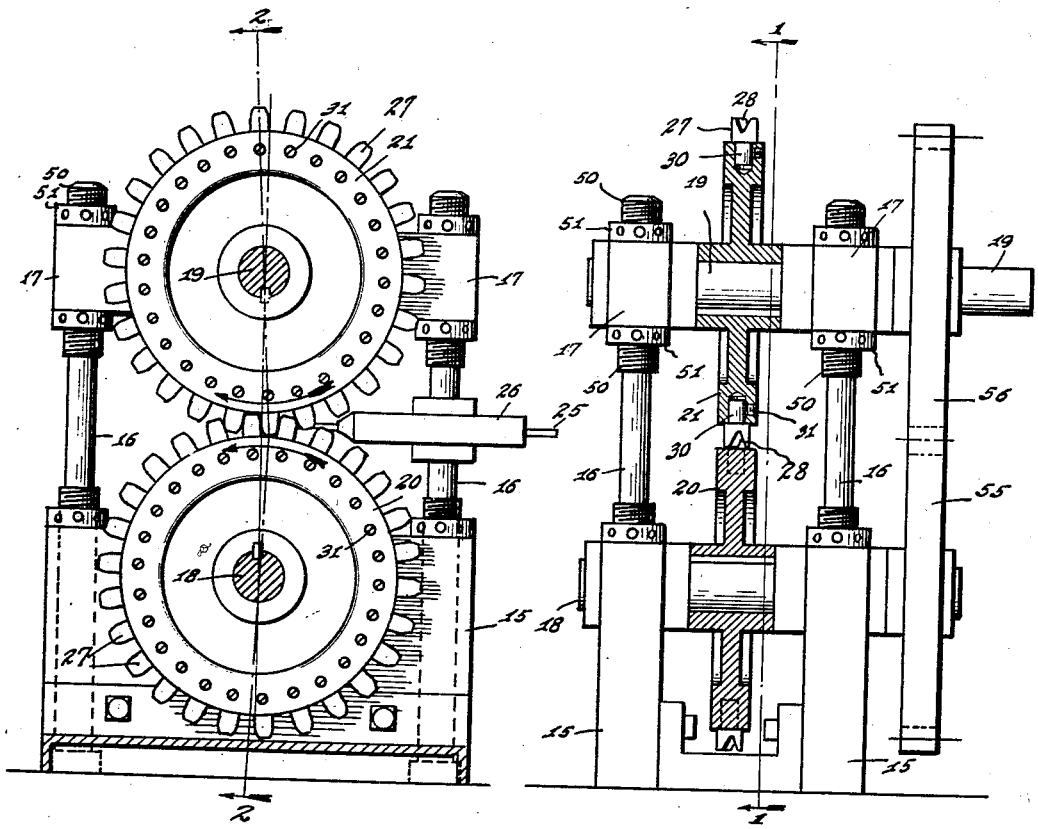
Figure 11:
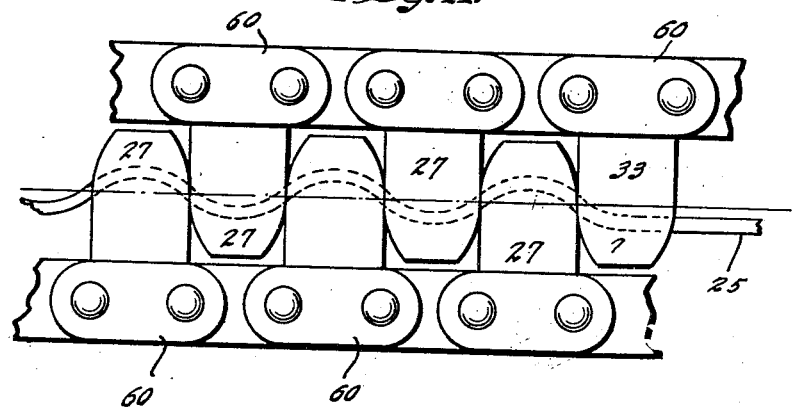

The accompanying drawings illustrate our invention: Fig. 1 is a vertical section through a helix-forming machine on the line 1—1 of Fig. 2; Fig. 2 is a vertical section on the line 2—2 of Fig. 1; Fig. 3 is a view similar to Fig. 1 but on an enlarged scale showing portions of the teeth broken away; Fig. 4 is a developed view of a series of teeth suitable for use in forming a wire tie; Fig. 5 is a view illustrating the completed tie applied to a wire; Fig. 6 is a plan view and Fig. 7 an elevation of a tooth used in forming a straight portion of the coiled article; Fig. 8 is a side elevation, in partial section, of a pair of co-operating cut-off teeth; Fig. 9 is a plan and Fig. 10 an elevation of one of the teeth used in forming the helically coiled portions of the article; and Fig. 11 is a modification of the invention in which the co-operating forming teeth are mounted upon endless chains rather than upon rigid wheels.

The machine illustrated in Fig. 1 comprises a frame 15 upon which are mounted two pairs of vertical standards 16 each pair of which serve as a support for a bearing member 17. Parallel shafts 18 and 19 are journaled respectively in the base 15 and in the bearing members 17; and these two shafts respectively carry, in co-planar relationship, a pair of wheels 20 and 21, the wheel 21 on the shaft 19 being disposed between the bearing members 17.

The wheels 20 and 21 carry annular series of meshing teeth grooved to deflect laterally a wire 25 fed between the wheels through a suitable guide 26. The teeth employed in the wheels may take various forms, but at least some of them will be teeth 27 such as are illustrated in Figs. 3, 9, and 10. Each of such teeth 27 is formed with a groove 28 at its outer end, the bottom of such groove being shaped to conform to the inner surface of a half-turn of the helix which the machine is to produce. The side walls of the groove 28 flare outwardly so as to receive the wire 25 as it emerges from the guide 26 and guide it into the bottom of the groove. As illustrated, the teeth 27 are individually formed, each being provided with a circular shank 30 adapted to be received in a recess in the periphery of the associated wheel and held in place therein as by a set screw 31.

If the machine is to form a continuous helix, all the teeth on both wheels 20 and 21 will be teeth 27 provided respectively with the helix-forming grooves 28. If, however, it is desired to produce an article in which the helix is interrupted, each of the wheels 20 and 21 may be provided with a series of teeth such as those illustrated at 33, such teeth being provided with wire-receiving grooves 34 disposed in a plane perpendicular to the axes of the shafts 18 and 19.

In Fig. 5, we have illustrated a wire-tie 36 as an example of an article such as our machine is adapted to produce. Such a tie consists of a straight intermediate portion provided centrally with an eye 37 and helically formed end portions 38. A tie of this kind may be used to support a wire, such as is indicated at 40, the helically formed end portions 38 of the tie embracing the wire, the straight intermediate portion of the tie being disposed parallel to and beside the wire 40, and the eye 37 being connected to some suitable support (not shown). By employing suitable wire forming teeth on the wheels 20 and 21, a tie of this kind can be formed in its entirety, with the exception of the eye 37, upon a machine of the kind illustrated in the drawings.

To arrange the machine for forming a wire tie 36 such as is illustrated in Fig. 5, we employ toothed wire-forming wheels having a pitch-circumference substantially equal to the length of the tie before the eye 37 is formed therein. The teeth on these wheels include a series of meshing teeth 33 which provide the intermediate straight portion of the tie, such straight portion being received in the plane grooves 34. Because the straight portion of the tie 36 is to lie at one side of the wire 40 with which the finished tie is used, the grooves 34 are offset axially of the wheels 20 and 21 from the center line of the teeth, as is clear from Figs. 4 and 6. The plane-grooved teeth 33 in each wheel are located between two series of helix-forming teeth 27a and 27b, as shown in the development constituting Fig. 4.

While the machine as so far described may be used to form wire-blanks cut to the proper length, we prefer to provide the wheels 20 and 21 with a pair of co-operating cut-off teeth 42 such as are illustrated in Fig. 8. These teeth are provided with plane wire-receiving grooves 43 similar to the grooves 34 in the teeth 33; but the grooves 43 are shallower than the grooves 34 so that the adjacent ends of the groove-bottoms, as the teeth 42 come into complete mesh with each other, will operate to shear the stock wire completely or partially. When the shearing teeth 42 are employed, one is placed on each wheel between the two series of helix-forming teeth 27a and 27b, as will be apparent from Fig. 4.

We find it desirable to mount the bearing blocks 17 for vertical adjustment in order to vary the distance between the two shafts 18 and 19. To this end, the standards 16 may be provided intermediately with screw-threads 50 for the reception of nuts 51 between which the bearing members 17 are clamped. The distance between the center-lines of the shafts 18 and 19 will affect the cross-sectional shape of the helix produced by the toothed wheels 20 and 21; and by suitable manipulation of the nuts 51 on the screw-threads 50, it is possible to adjust the vertical position of the shaft 19 until the helix formed by the toothed wheels is substantially circular in cross-section.

While it is possible to drive one of the toothed wheels 20 and 21 from the other through the meshing wire-forming teeth, we prefer to employ an independent driving means. In the drawings, I have shown the shafts 18 and 19 as provided with meshing spur gears 55 and 56 of equal diameter, and the shaft 19 as projecting beyond the gear 56 for connection to some suitable source of power (not shown). The teeth on the gears 55 and 56 should be large enough so that any necessary vertical adjustment of the shaft 19 will not interfere seriously with the manner in which those gears mesh.

In the operation of the machine, the wheels 20 and 21 are rotated in opposite directions by the gearing 55 and 56 as the stock wire 25 is fed through the guide 26 into the space between the two wheels. During rotation of the wheels, the teeth 27 successively come into association with the stock wire as it emerges from the guide 26 and the wire is received in the grooves 28 the sloping side walls of which are far enough apart at their outer edges to avoid interference with the entrance of the wire. As rotation of the wheels 20 and 21 continues, the wire will be forced deeper into the grooves, the sloping side walls of the grooves deflecting the wire laterally of itself alternately in opposite directions. By the time the teeth reach complete mesh, the wire will have been forced completely into the bottoms of the grooves 28 and given the desired helical form.

In the specific tie-forming machine shown in the drawings, after the teeth 27a have formed one helical end portion 38 of the tie, the stock wire is received successively in the plane grooves of the teeth 33 and is not deflected thereby; and after the stock wire has passed through all the teeth 33, the teeth 27b act on it to form the other helical end portion of the tie. Thereafter, the cut-off teeth 42 come into association with the wire, and partially or completely shear the tie from the stock, and the formation of a new tie begins immediately.

As will be clear from Fig. 3, several of the helix-forming teeth will be simultaneously in engagement with the wire and will operate to draw the wire through the guide 26, so that no wire-feeding mechanism is required. In teeth, such as the teeth 33, which do not deflect the wire laterally of itself, the grooves 34 are desirably made shallow enough that co-operating teeth on the two wheels will grip the wire 25 frictionally, although with insufficient force to distort it, thus providing for feeding of the wire while straight portions are being formed therein.

In situations where the article to be formed has a length great enough that the wheels 20 and 21 would be of inordinately large diameter, and perhaps in other situations as well, we may mount helix-forming teeth 27 upon the links 60 of endless chains, as indicated in Fig. 11.

It will be understood that our invention, in its broader aspects, is not limited to the specific tie-forming machine above described. We may employ on the wheels 20 and 21 (or on the chains 60) only helix-forming teeth 27, in which event the machine would be adapted to form a continuous helix. By using only teeth 27 and one or more pairs of cut-off teeth 42, the machine could be employed to form helices of definite length. In short, our broad invention is not concerned with what kind of teeth or other wire-forming elements are employed in association with the helix-forming teeth 27.

Since the action of the teeth on the wire is progressive, each half-turn of the helix is at least partially formed before the formation of the succeeding half-turn commences. As a result, there is little drawing of the wire through the teeth and rubbing of the wire against the side and bottoms of the grooves in the teeth is held substantially to a minimum. We find that galvanized wire can be formed into helices in the manner described without any material injury to the galvanized coating. To lessen the chance of injury to the surface of the wire, it will usually be desirable to round the edges of the grooves 28, such rounding not being indicated in the drawings as it would complicate the showing.

In the conventional method of forming a wire helix, as by wrapping stock wire about a rotating mandrel, the progressive lateral deflection of the stock wire occurs in a plane which always remains in fixed position relative to the axis of the undeflected wire. In contrast to this, the helix produced by the application of our invention is formed by progressively deflecting the wire laterally of itself while progressively rotating the plane of deflection relative to the axis of the undeflected wire.

It will of course be understood by those skilled in the art of wire-working that, owing to the elasticity of wire, it will be necessary to have the groove-bottoms of the helix-forming teeth slightly different in shape from the inner surface of the eventual helix. In other words, it is necessary in the forming operation to deflect the wire to an extent somewhat greater than that represented by the finished helix, and the tooth-grooves should be designed and the tooth-carrying wheels spaced accordingly.

We claim as our invention:

1. In a machine for forming wire into a helix, a pair of wheels arranged for rotation in opposite directions on parallel axes, meshing series of wire-forming teeth mounted respectively on said wheels, each of said teeth being provided in its outer face with a wire-receiving groove the bottom of which substantially conforms to the inner surface of a half-turn of the helix to be formed, said grooves having side walls which diverge outwardly from the groove-bottoms to receive a substantially straight wire fed tangentially to the wheels and guide it into the groove-bottoms as the wheels rotate.

2. In a machine for forming wire into a helix, two series of teeth, and means for supporting said teeth and for moving them in succession over converging paths into full meshing relationship, the teeth of said two series being provided in their adjacent faces with wire-receiving grooves the bottom of each of which conforms substantially to the inner surface of a half-turn of the helix to be formed, said grooves having side walls which diverge outwardly from the groove-bottoms to receive and guide into the groove bottoms a wire fed between the two series of teeth as they converge.

3. The invention set forth in claim 1 with the addition of a pair of co-operating wire-shearing teeth mounted respectively on said two wheels.

4. The invention set forth in claim 2 with the addition of a pair of co-operating wire-shearing teeth associated respectively with said two series of wire-forming teeth and movable therewith.

5. The invention set forth in claim 1 with the addition of additional series of meshing teeth mounted respectively on said wheels, the teeth of said additional series being provided wth wire-receiving grooves each disposed in a common plane perpendicular to the axes of said wheels.

6. In a machine for forming wire ties having helical end portions, a pair of wheels mounted for rotation about parallel axes and provided respectively with meshing teeth, said teeth including a pair of co-operating wire-shearing teeth mounted respectively on the two wheels, the teeth of each wheel including two series of wire-forming teeth extending circumferentially in opposite directions from the associated shearing tooth and also including, between the ends of the two series of wire-forming teeth, a series of teeth provided in their outer surfaces with grooves disposed in a common plane perpendicular to the axes of the wheels, each of said wire-forming teeth being provided in its outer face with a groove having a bottom conforming to the inner surface of a half-turn of the helical end portion of the tie, said grooves having side walls which diverge outwardly from the groove-bottoms to receive a substantially straight wire fed tangentially to the wheels and guide it into the groove-bottoms as the wheels rotate.

7. The invention set forth in claim 1 with the addition of means drivingly interconnecting said wheels independently of said wire-forming teeth.

8. The invention set forth in claim 1 with the addition of means supporting said wheels for adjustment toward and away from each other.

9. The invention set forth in claim 1 with the addition of means supporting said wheels for adjustment toward and away from each other and means drivingly interconnecting said wheels independently of said wire-forming teeth.

ALVIN W. HOLMES.
GEORGE W. BENJAMIN.
LUTHER P. YOUNG.